United States Patent
Xu

(10) Patent No.: US 12,457,472 B2
(45) Date of Patent: Oct. 28, 2025

(54) METHOD AND APPARATUS FOR USER EQUIPMENT BEHAVIOUR PARAMETERS PROVISIONING

(71) Applicant: Telefonaktiebolaget LM Ericsson (publ), Stockholm (SE)

(72) Inventor: Wenliang Xu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 395 days.

(21) Appl. No.: 17/599,601

(22) PCT Filed: Feb. 27, 2020

(86) PCT No.: PCT/CN2020/076950
§ 371 (c)(1),
(2) Date: Sep. 29, 2021

(87) PCT Pub. No.: WO2020/199805
PCT Pub. Date: Oct. 8, 2020

(65) Prior Publication Data
US 2022/0167124 A1   May 26, 2022

(30) Foreign Application Priority Data

Feb. 27, 2019   (WO) ................ PCT/CN2019/080421

(51) Int. Cl.
*H04W 4/029*   (2018.01)
*H04W 4/021*   (2018.01)
(Continued)

(52) U.S. Cl.
CPC .......... *H04W 4/029* (2018.02); *H04W 4/021* (2013.01); *H04W 8/186* (2013.01); *H04W 56/0005* (2013.01)

(58) Field of Classification Search
CPC ..... H04W 4/029; H04W 4/021; H04W 8/186; H04W 56/0005; H04W 24/10;
(Continued)

(56) References Cited

U.S. PATENT DOCUMENTS

2013/0166073 A1*   6/2013   Pine ..................... F24F 11/30
                                                       700/276
2013/0217419 A1   8/2013   Jodlauk et al.
(Continued)

FOREIGN PATENT DOCUMENTS

CN   107071725 A   8/2017
CN   109417733 A   3/2019

OTHER PUBLICATIONS

3GPP TS 29.122 V15.1.0 (Sep. 2018), 3rd Generation Partnership Project; Technical Specification Group Core Network and Terminals; T8 reference point for Northbound APIs; (Release 15) (Year: 2018).*

(Continued)

*Primary Examiner* — Diane D Mizrahi
*Assistant Examiner* — Jing Gao
(74) *Attorney, Agent, or Firm* — Withrow & Terranova, PLLC

(57) ABSTRACT

Embodiments of the present disclosure provide methods and apparatuses for user equipment (UE) behaviour parameters provisioning. A method at a server may comprise obtaining one or more expected UE behaviour parameters having timing information of one or more or a group of UEs; and sending to a network exposure entity a first parameter provisioning message including the one or more expected UE behaviour parameters having timing information of one or more or a group of UEs.

25 Claims, 5 Drawing Sheets

(51) Int. Cl.
*H04W 8/18* (2009.01)
*H04W 56/00* (2009.01)

(58) Field of Classification Search
CPC ....... H04W 4/50; H04W 48/18; H04W 24/08; H04W 24/06; H04W 24/02; H04W 4/02; H04W 64/00; H04W 72/51; H04W 72/542; H04W 64/003; H04W 4/026; H04W 4/027; H04W 88/06; H04W 8/08; H04W 60/02; H04W 4/08; H04W 40/02; H04W 40/18; H04W 12/63; H04L 67/306; H04L 67/52; H04L 69/28; H04L 61/4511

See application file for complete search history.

(56) References Cited

U.S. PATENT DOCUMENTS

| | | | |
|---|---|---|---|
| 2013/0252649 A1 | 9/2013 | Siomina et al. | |
| 2014/0310366 A1* | 10/2014 | Fu | H04L 51/04 709/206 |
| 2015/0304812 A1* | 10/2015 | Khosla | H04W 4/029 455/456.1 |
| 2018/0070268 A1* | 3/2018 | Iwai | H04W 92/04 |
| 2018/0227872 A1* | 8/2018 | Li | H04W 8/02 |

OTHER PUBLICATIONS

3GPP TS 23.502 V16.0.0 (Mar. 27, 2019); 3rd Generation Partnership Project; Technical Specification Group Services and System Aspects; Procedures for the 5G System; Stage 2 (Release 16) (Year: 2019).*
Author Unknown, "Technical Specification Group Core Network and Terminals; T8 reference point for Northbound APIs; (Release 15)," Technical Specification 29.122, Version 15.1.0, Sep. 2018, 3GPP Organizational Partners, 273 pages.
Sony, et al., "S2-178407: TS 23.502: Provisioning parameter: Expected UE Mobility," 3GPP SA WG2 Meeting #124, Nov. 27-Dec. 1, 2017, Reno, Nevada, 3 pages.
First Office Action for Chinese Patent Application No. 2020800255127, mailed May 13, 2023, 12 pages.
Extended European Search Report for European Patent Application No. 20784407.7, mailed Nov. 15, 2022, 8 pages.
Examination Report for Indian Patent Application No. 202147048779, mailed Aug. 29, 2022, 6 pages.
Author Unknown, "Technical Specification Group Services and System Aspects; System Architecture for the 5G System; Stage 2 (Release 15)," Technical Specification 23.501, Version 15.4.0, 3GPP Organizational Partners, Dec. 2018, 236 pages.
Author Unknown, "Technical Specification Group Services and System Aspects; System Architecture for the 5G System; Stage 2 (Release 16)," Technical Specification 23.501, Version 16.0.0, 3GPP Organizational Partners, Mar. 2019, 318 pages.
Author Unknown, "Technical Specification Group Services and System Aspects; Procedures for the 5G System; Stage 2 (Release 15)," Technical Specification 23.502, Version 15.4.1, 3GPP Organizational Partners, Jan. 2019, 347 pages.
Author Unknown, "Technical Specification Group Services and System Aspects; Procedures for the 5G System; Stage 2 (Release 16)," Technical Specification 23.502, Version 16.0.0, 3GPP Organizational Partners, Mar. 2019, 420 pages.
Author Unknown, "Technical Specification Group Services and System Aspects; Architecture enhancements to facilitate communications with packet data networks and applications (Release 16)," Technical Specification 23.682, Version 16.2.0, 3GPP Organizational Partners, Mar. 2019, 126 pages.
Author Unknown, "Technical Specification Group Core Network and Terminals; T8 reference point for Northbound APIs; (Release 16)," Technical Specification 29.122, Version 16.0.0, 3GPP Organizational Partners, Dec. 2018, 298 pages.
Author Unknown, "Technical Specification Group Core Network and Terminals; T8 reference point for Northbound APIs; (Release 16)," Technical Specification 29.122, Version 16.1.0, 3GPP Organizational Partners, Mar. 2019, 288 pages.
Author Unknown, "Technical Specification Group Core Network and Terminals; 5G System; Unified Data Management Services; Stage 3 (Release 15)," Technical Specification 29.503, Version 15.3.0, 3GPP Organizational Partners, Mar. 2019, 187 pages.
Author Unknown, "Technical Specification Group Core Network and Terminals; 5G System; Usage of the Unified Data Repository services for Subscription Data; Stage 3 (Release 15)," Technical Specification 29.505, Version 15.3.0, 3GPP Organizational Partners, Mar. 2019, 101 pages.
International Search Report and Written Opinion for International Patent Application No. PCT/CN2020/076950, mailed Apr. 24, 2020, 10 pages.

* cited by examiner

200

202

Obtaining one or more expected user equipment (UE) behaviour parameters having timing information of one or more or a group of UEs

204

Sending to a network exposure entity a first parameter provisioning message including the one or more expected user equipment (UE) behaviour parameters having timing information of one or more or a group of UEs

METHOD AND APPARATUS FOR USER EQUIPMENT BEHAVIOUR PARAMETERS PROVISIONING

This application is a 35 U.S.C. § 371 national phase filing of International Application No. PCT/CN2020/076950, filed Feb. 27, 2020, which claims the benefit of International Application No. PCT/CN2019/080421, filed Mar. 29, 2019, the disclosures of which are hereby incorporated herein by reference in their entireties.

TECHNICAL FIELD

The non-limiting and exemplary embodiments of the present disclosure generally relate to the technical field of communications, and specifically to methods and apparatuses for user equipment (UE) behaviour parameters provisioning.

BACKGROUND

This section introduces aspects that may facilitate a better understanding of the disclosure. Accordingly, the statements of this section are to be read in this light and are not to be understood as admissions about what is in the prior art or what is not in the prior art.

In a communication network, a server such as services capability server/an application server (SCS/AS) or application function (AF) entity may provision expected UE behavioural information to the network via a network device such as service capability exposure function (SCEF) or network exposure function (NEF). The provisioning information may comprise information on expected UE movement and communication characteristics. The provisioned information can be used by other network device such as network function (NF) entity.

As described in subclause 5.3.4.2 of 3rd Generation Partnership Project (3GPP) TS23.501 V15.4.0, the disclosure of which is incorporated by reference herein in its entirety, the mobility pattern is a concept that may be used by the AMF (Access and Mobility Management Function) to characterise and optimise the UE mobility. The AMF determines and updates mobility pattern of the UE based on subscription of the UE, statistics of the UE mobility, network local policy, and the UE assisted information, or any combination of them. The statistics of the UE mobility can be historical or expected UE moving trajectory. The mobility pattern can be used by the AMF to optimize mobility support provided to the UE, for example, registration area allocation.

As described in subclause 4.15.6.3 of 3GPP TS 23.502 V15.4.1, the disclosure of which is incorporated by reference herein in its entirety, these Expected UE Behaviour parameters characterise the foreseen behaviour of a UE or a group of UEs. Sets of these parameters may be provided via the NEF to be stored as part of the subscriber data. Each parameter within the Expected UE Behaviour shall have an associating validity time. The validity time indicates when the Expected UE Behaviour parameter expires and shall be deleted by the related NFs. The validity time may be set to indicate that the particular Expected UE Behaviour parameter has no expiration time. When the validity time expires, the related NFs delete their local copy of the associated Expected UE Behaviour parameter(s). The provision procedure of the Expected UE Behaviour is realized by external parameter provision procedure defined in clause 4.15.6.2 of 3GPP TS23.502 V15.4.1. Expected UE Moving Trajectory is defined by subclause 4.15.6.3 of 3GPP TS 23.502 V15.4.1 as an expected UE Behaviour parameter, which identifies the UE's expected geographical movement, for example a planned path of movement.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

There are some problems with the existing external parameter provision procedure as defined in clause 4.15.6.2 of 3GPP TS23.502 V15.4.1. For example, the UE moving trajectory only includes a list of UE locations describing the UE mobility pattern, such pattern may be taken into consideration by a network device such as AMF to optimize the mobility support provided to the UE, for example, registration area allocation. But the UE moving trajectory doesn't include other useful information such as timing information (e.g., timestamp or a time of day and/or duration), velocity and/or acceleration information, periodicity information etc. The current UE moving trajectory may cause wrong optimization in the network device such as AMF for the UE mobility support. For example, if UE moving trajectory starts at 8:00 am and stops at 9:00 am, the network device such as AMF may derive wrong mobility information for the UE if UE is initially registered in the network such as 5GS (the fifth generation system) at 10:00 am. Moreover, the UE moving trajectory may also be used to assist the radio access network (RAN) optimization (e.g. parameters related to RAN Notification Area in Radio Resource Control (RRC) Inactive Assistance Information), it is useful to include duration indicating how long the UE stays in the provided location of UE moving trajectory. Therefore the current UE moving trajectory may not be sufficient to support UE mobility optimization or wrong information may be derived from the current UE moving trajectory.

To overcome or mitigate at least one above mentioned problems or other problems or provide a useful solution, the embodiments of the present disclosure propose an improved UE behaviour parameters provisioning solution.

In a first aspect of the disclosure, there is provided a method at a server. The method comprises obtaining one or more expected UE behaviour parameters having timing information of one or more or a group of UEs; and sending to a network exposure entity a first parameter provisioning message including the one or more expected UE behaviour parameters having timing information of one or more or a group of UEs.

In an embodiment, obtaining one or more expected UE behaviour parameters having timing information of one or more or a group of UEs may comprise receiving the one or more expected UE behaviour parameters having timing information of one or more or a group of UEs from the one or more or the group of UEs; and/or determining the one or more expected UE behaviour parameters having timing information of one or more or the group of UEs based on activity of the one or more or the group of UEs.

In an embodiment, the one or more expected UE behaviour parameters may comprise expected UE moving trajectory.

In an embodiment, the expected UE moving trajectory may comprise one or more locations and the timing information and the timing information comprises a timestamp or a time of day indicating when a UE arrives at a location and/or duration indicating time that the UE stays in the location.

In an embodiment, the location may be identified by at least one of a geographic area; a civic address; a network area information; and a coordinate of the UE.

In an embodiment, the civic address may comprise street address and/or zip code, the network area information may comprise tracking area identity and/or cell identifier, and the coordinate of the UE may comprise longitude and latitude.

In an embodiment, the one or more expected UE behaviour parameters further comprise velocity and/or acceleration information and/or periodicity information.

In an embodiment, the one or more expected UE behaviour parameters may have respective associated validity time.

In an embodiment, the first parameter provisioning message may be a Hypertext Transfer Protocol (HTTP) POST message for creating new subscription resources of provisioning communication pattern parameter set(s); or the first parameter provisioning message may be an HTTP PUT message for modifying a communication pattern parameter provisioning subscription resource; or the first parameter provisioning message may be an HTTP PUT message for updating communication pattern at individual communication pattern set(s) level associated with a communication pattern parameter set identifier.

In an embodiment, the server may comprise a service capability server/an application server (SCS/AS) or an application function (AF) entity and the network exposure entity comprises a service capability exposure function (SCEF) entity or a network exposure function (NEF) entity.

In an embodiment, the one or more expected UE behaviour parameters may be used for setting of mobility management and/or session management parameters of the one or more or the group of UEs.

In an embodiment, the first parameter provisioning message may be a Nnef_ParameterProvision_Update request and the method may further comprise receiving from the network exposure entity a Nnef_ParameterProvision_Update response.

In a second aspect of the disclosure, there is provided a method at a network exposure entity. The method comprises receiving from a server a first parameter provisioning message including one or more expected UE behaviour parameters having timing information of one or more or a group of UEs; and processing the first parameter provisioning message.

In an embodiment, the first parameter provisioning message may be a Nnef_ParameterProvision_Update request and the method may further comprise sending to the server a Nnef_ParameterProvision_Update response.

In an embodiment, processing the first parameter provisioning message may comprise determining whether the server is authorised to provision the one or more expected UE behaviour parameters; and when the server is authorised to provision the one or more expected UE behaviour parameters, sending a second parameter provisioning message including the one or more expected UE behaviour parameters having timing information to a user data management node or a data repository node.

In an embodiment, the user data management node may be configured to determine whether the server is authorised to provision the one or more expected UE behaviour parameters and request the data repository node to store the one or more expected UE behaviour parameters as a part of subscription data when the server is authorised to provision the one or more expected UE behaviour parameters.

In an embodiment, the data repository node may be configured to store the one or more expected UE behaviour parameters as a part of subscription data.

In an embodiment, the user data management node may comprise a unified data management (UDM) node and/or the data repository node may comprise a unified data repository (UDR) node.

In an embodiment, the second parameter provisioning message may comprise an Nudm_ParameterProvision_Update request message or Nudr_DM_Update request message.

In an embodiment, the Nudm_ParameterProvision_Update request message and Nudr_DM_Update request message may be a Hypertext Transfer Protocol (HTTP) PATCH request message.

In an embodiment, the user data management node may be configured to notify a subscribed network function entity of updated subscriber data.

In a third aspect of the disclosure, there is provided an apparatus implemented at a server. The apparatus comprises a processor; and a memory coupled to the processor, said memory containing instructions executable by said processor, whereby said apparatus is operative to obtain one or more expected UE behaviour parameters having timing information of one or more or a group of UEs; and send to a network exposure entity a first parameter provisioning message including the one or more expected UE behaviour parameters having timing information of one or more or a group of UEs.

In a fourth aspect of the disclosure, there is provided an apparatus implemented at a network exposure entity. The apparatus comprises a processor; and a memory coupled to the processor, said memory containing instructions executable by said processor, whereby said apparatus is operative to receive from a server a first parameter provisioning message including one or more expected UE behaviour parameters having timing information of one or more or a group of UEs; and process the first parameter provisioning message.

In a fifth aspect of the disclosure, there is provided a computer program product, comprising instructions which, when executed on at least one processor, cause the at least one processor to carry out the method according to the first aspect of the disclosure.

In a sixth aspect of the disclosure, there is provided a computer program product, comprising instructions which, when executed on at least one processor, cause the at least one processor to carry out the method according to the second aspect of the disclosure.

In a seventh aspect of the disclosure, there is provided a computer-readable storage medium storing instructions which when executed by at least one processor, cause the at least one processor to carry out the method according to the first aspect of the disclosure.

In an eighth aspect of the disclosure, there is provided a computer-readable storage medium storing instructions which when executed by at least one processor, cause the at least one processor to carry out the method according to the second aspect of the disclosure.

Many advantages may be achieved by applying the proposed solution according to some embodiments of the present disclosure. For example, the proposed solution can avoid misuse of the expected UE behaviour parameters provided by the AF and improve the mobility management and/or session management of the one or more or the group of UEs.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figures 1, 2:
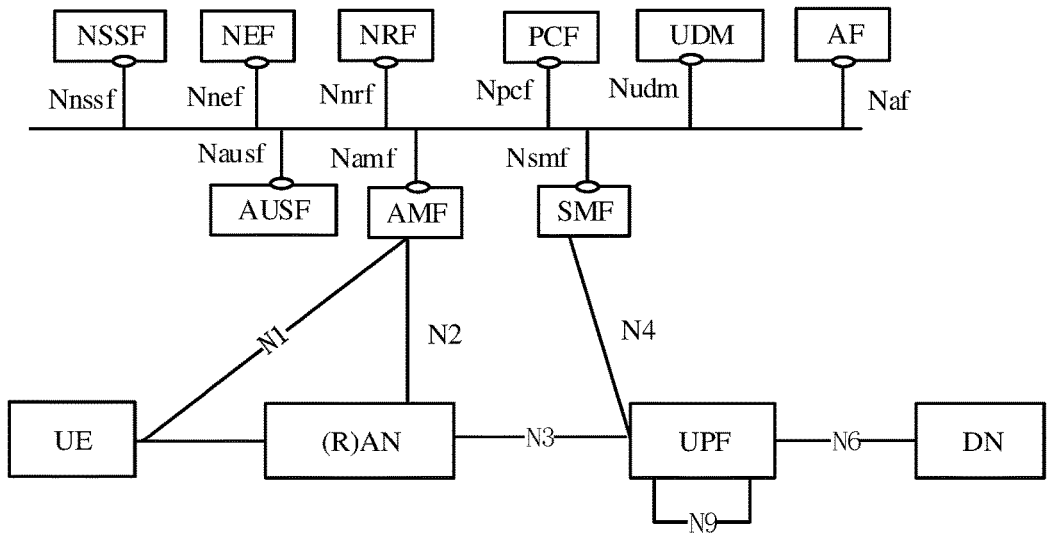
FIG. 1 schematically shows a high level architecture in the next generation network.
FIG. 2 shows a flowchart of a method according to an embodiment of the present disclosure.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein, the term "communication network" refers to a network following any suitable communication standards, such as LTE-Advanced (LTE-A), LTE, new radio (NR) and so on. In the following description, the terms "network" and "system" can be used interchangeably. Furthermore, the communications between a terminal device and a network device in the wireless network may be performed according to any suitable generation communication protocols, including, but not limited to fourth generation (4G) communication protocols such as LTE, fifth generation (5G) communication protocols such as NR, and/or any other protocols either currently known or to be developed in the future.

The term "network device" refers to a network device in a wireless communication network via which a terminal device accesses to the network and receives services therefrom. For example, in a wireless communication network such as a 3GPP-type cellular network, the network device may comprise access network device and core network device. For example, the access network device may comprise base station (BS), an Integrated Access and Backhaul (IAB) node, an access point (AP), a multi-cell/multicast coordination entity (MCE), etc. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth. The core network device may comprise a plurality of network devices which may offer numerous services to the customers who are interconnected by the access network device. Each access network device is connectable to the core network device over a wired or wireless connection.

The term "network function (NF)" refers to any suitable function which can be implemented in a network device of a wireless communication network. For example, in 5G network, the network function may comprise a plurality of NFs such as Authentication Server Function (AUSF), AMF, Data Network (DN) (e.g. operator services, Internet access or 3rd party services), Network Exposure Function (NEF), Network Repository Function (NRF), Network Slice Selection Function (NSSF), Policy Control Function (PCF), Session Management Function (SMF), Unified Data Management (UDM), User Plane Function (UPF), Application Function (AF), UE, (Radio) Access Network ((R)AN), 5G-Equipment Identity Register (5G-EIR), Security Edge Protection Proxy (SEPP), Network Data Analytics Function (NWDAF), Unified Data Repository (UDR), Unstructured Data Storage Function (UDSF), etc.

The term "terminal device" refers to any end device that can access a communication network and receive services therefrom. By way of example and not limitation, in the wireless communication network, the terminal device may refer to a mobile terminal, a UE, or other suitable devices. The terminal device may be, for example, a Subscriber Station (SS), a Portable Subscriber Station, a Mobile Station (MS), or an Access Terminal (AT). The terminal device may include, but not limited to, a portable computer, an image capture device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable device, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The UE may in this case be a machine-to-machine (M2M)

device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Although the subject matter described herein may be implemented in any appropriate type of system using any suitable components, the embodiments disclosed herein are described in relation to a communication system comprising at least the components as illustrated in FIG. 1.

FIG. 1 schematically shows a high level architecture in the next generation network such as 5G. For simplicity, the system architecture of FIG. 1 only depicts some exemplary elements such as AUSF, AMF, DN, NEF, NRF, NSSF, PCF, SMF, UDM, UPF, AF, UE, (R)AN. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

In accordance with an exemplary embodiment, the UE can establish a signaling connection with the AMF over the reference point N1, as illustrated in FIG. 1. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a packet data unit (PDU) session to the DN (data network, e.g. an operator network or Internet) through the UPF over the reference point N6.

As further illustrated in FIG. 1, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 1 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 1 may be responsible for functions such as session management, mobility management, authentication, and security. Various NFs such as AUSF, AMF, DN, NEF, NRF, NSSF, PCF, SMF, UDM, UPF, AF, UE, (R)AN may include the functionality for example as defined in clause 6.2 of 3GPP TS23.501 V15.4.0.

FIG. 2 shows a flowchart of a method 200 according to an embodiment of the present disclosure, which may be performed by an apparatus implemented in or at or as a server such as SCS/AS or AF or communicatively coupled to the server such as SCS/AS or AF. As such, the apparatus may provide means or modules or circuits for accomplishing various parts of the method 200 as well as means or modules or circuits for accomplishing other processes in conjunction with other components.

At block 202, the server obtains one or more expected UE behaviour parameters having timing information of one or more or a group of UEs. The server may be any suitable server which can communicate with the network exposure entity such as NEF or SCEF. In addition, the server may provide one or more services to the one or more or the group of UEs. For example, the server may be SCS/AS or AF. The one or more expected UE behaviour parameters may comprise any suitable UE behaviour parameters which can be learned from activity of the UE or the user of the UE, for example expected UE moving trajectory, network attach feature, IMS (Internet protocol Multimedia Subsystem) registration feature, service use feature, etc. In addition, a part of or all expected UE behaviour parameters may have timing information. In an embodiment, the one or more expected UE behaviour parameters may comprise expected UE moving trajectory having timing information. The expected UE moving trajectory may be provided in various ways. For example, the UE moving trajectory may comprise UE's locations and each location may have its timing information. In another example, the UE moving trajectory may be a mathematic function of time and location from which the UE's location having timing information can be determined.

In an embodiment, the expected UE moving trajectory may comprise one or more locations and timing information. For example, each location may have its timing information.

The timing information may have various time granularity. In an embodiment, the timing information may comprise a timestamp or a time of day indicating when a UE arrives at a location and/or duration indicating time that the UE stays in the location. The timing information can be provided in various ways. As a first example, the timing information may be a timestamp or a time of day and each location may have its timestamp or the time of day. As a second example, the start location may have a start time such as timestamp or the time of day and the subsequent locations may have a time increment starting from the start time.

The location of the UE may be identified in various ways. In an embodiment, the location may be identified by at least one of a geographic area, a civic address; a network area information; and a coordinate of the UE. For example, the civic address may comprise street address and/or zip code. The network area information may comprise tracking area identity and/or cell identifier. The coordinate of the UE comprises longitude and latitude.

In an embodiment, the one or more expected UE behaviour parameters may further comprise velocity and/or acceleration information and/or periodicity information. The velocity and/or acceleration information may be used by a network device such as AMF to characterise the foreseen location of one or more UE or the group of UEs. For example, when the expected UE moving trajectory comprises a start location, an end location, the average speed of the UE and a timestamp or a time of day of the start location, the network device such as AMF can estimate any location of the UE between the start location and end location assuming the moving direction of the UE is from the start location to the end location. The periodicity information may indicate the periodicity of the one or more expected UE behaviour parameters. The periodicity information may be expressed in various ways such as day of week, day of month, workday, weekend, holiday, etc. The periodicity information may be used by a network device such as AMF to characterise the expected UE behaviour periodicity of one or more UE or the group of UEs. For example, when the one or more expected UE behaviour parameters with periodicity information such as Monday, the network device such as AMF may characterise the one or more expected UE behaviours such as locations of one or more UE or the group of UEs every Monday.

In an embodiment, the one or more expected UE behaviour parameters have respective associated validity time. The validity time indicates when the expected UE behaviour parameter expires and shall be deleted by the related network device such as NFs. The validity time may be set to indicate that the particular expected UE behaviour parameter has no expiration time. When the validity time expires, the related network device such as NFs delete their local copy of the associated expected UE behaviour parameter(s).

The server may obtain the one or more expected UE behaviour parameters in various ways. For example, the server may obtain the one or more expected UE behaviour parameters from a network device for example Location Management Function (LMF) entity and/or from other server and/or from the one or more or the group of UEs. In addition, the server may determine the one or more expected UE behaviour parameters by itself. The server may obtain the one or more expected UE behaviour parameters periodically and/or according to network configuration information and/or in response to a change of subscription information of the user of the UE.

In an embodiment, the server may receive the one or more expected UE behaviour parameters having timing information of one or more or the group of UEs from the one or more or the group of UEs. For example, the UE may collect its UE behaviour events and then learn its expected UE behaviour parameters based on the collected its UE behaviour events for example by using machine learning.

In an embodiment, the server may determine the one or more expected UE behaviour parameters having timing information of one or more or the group of UEs based on activity of the one or more or the group of UEs. For example, the server may collect the activity of the one or more or the group of UEs for example from the one or more or the group of UEs and/or from a network device such as LMF and/or from another server, etc. and then learn the expected UE behaviour parameters based on activity of the one or more or the group of UEs for example by using machine learning.

At block 204, the server sends to a network exposure entity a first parameter provisioning message including the one or more expected UE behaviour parameters having timing information of one or more or a group of UEs. The network exposure entity may be any suitable network device which can provide a means for the server such as AF or SCS/AS to securely provide information such as expected UE behaviour to the network. The one or more expected UE behaviour parameters may be used by other network device such as AMF to set mobility management and/or session management parameters of the one or more or the group of UEs and/or for other purposes such as analytics.

In an embodiment, the first parameter provisioning message may be a Hypertext Transfer Protocol (HTTP) POST message for creating new subscription resources of provisioning communication pattern parameter set(s). The HTTP POST message may be similar to the corresponding message as described in clause 5.10.3.1 of TS 29.122 V16.0.0, the disclosure of which is incorporated by reference herein in its entirety.

In an embodiment, the first parameter provisioning message may be an HTTP PUT message for modifying a communication pattern parameter provisioning subscription resource. The HTTP PUT message may be similar to the corresponding message as described in clause 5.10.3.1 of TS 29.122 V16.0.0.

In an embodiment, the first parameter provisioning message may be an HTTP PUT message for updating communication pattern at individual communication pattern set(s) level associated with a communication pattern parameter set identifier. The HTTP PUT message may be similar to the corresponding message as described in clause 5.10.3.1 of TS 29.122 V16.0.0.

Figure 3:
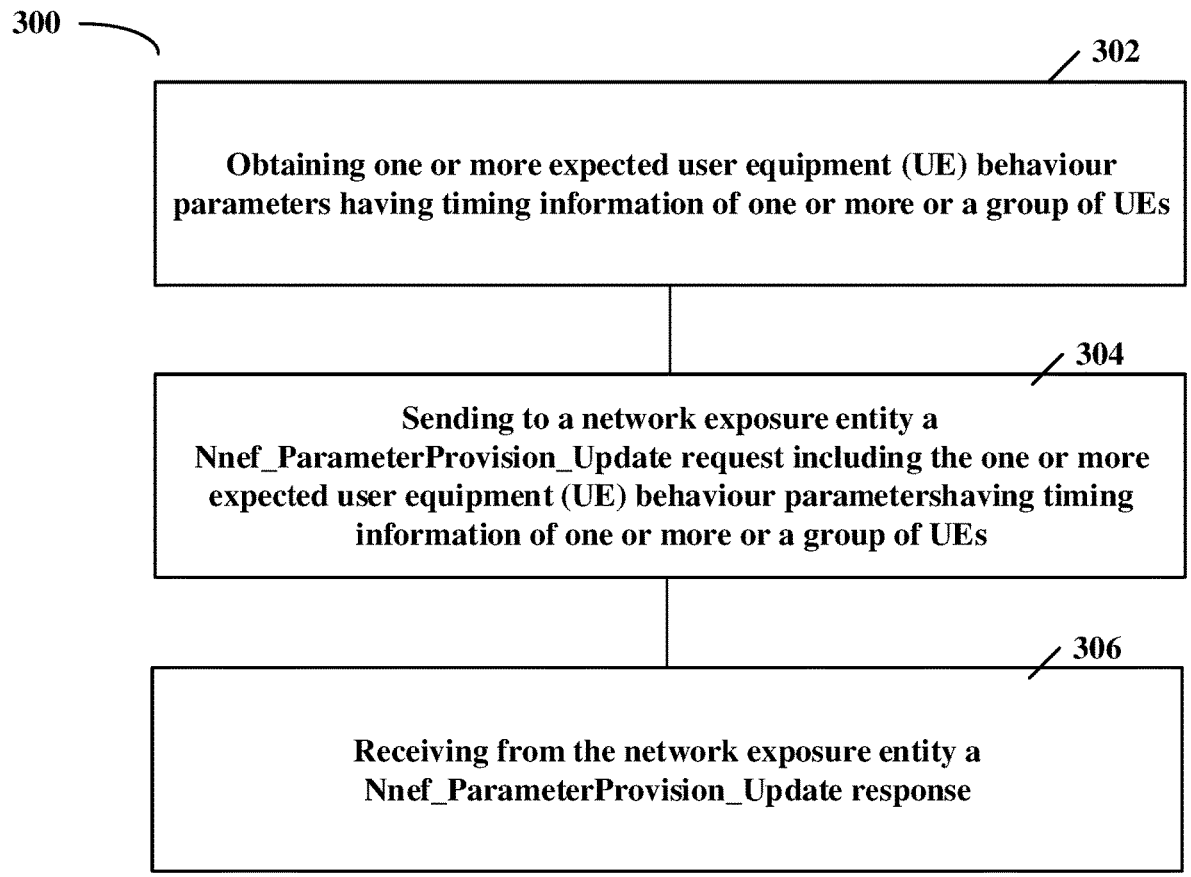
FIG. 3 shows a flowchart of a method according to another embodiment of the present disclosure.

FIG. 3 shows a flowchart of a method 300 according to an embodiment of the present disclosure, which may be performed by an apparatus implemented in or at or as a network exposure entity such as SCS/AS or AF or communicatively coupled to the server such as SCS/AS or AF. As such, the apparatus may provide means or modules or circuits for accomplishing various parts of the method 300 as well as means or modules or circuits for accomplishing other processes in conjunction with other components. For some parts which have been described in the above embodiments, detailed description thereof is omitted here for brevity. In this embodiment, the first parameter provisioning message is a Nnef_ParameterProvision_Update request as described in clause 4.15.6.2 of 3GPP TS23.502 V15.4.1, which includes the one or more expected UE behaviour parameters having timing information of one or more or a group of UEs.

At block 302, the server obtains one or more expected UE behaviour parameters having timing information of one or more or a group of UEs.

At block 304, the server sends to a network exposure entity a Nnef_ParameterProvision_Update request including the one or more expected UE behaviour parameters having timing information of one or more or a group of UEs.

At block 306, the server receives from the network exposure entity a Nnef_ParameterProvision_Update response as described in clause 4.15.6.2 of 3GPP TS23.502 V15.4.1.

Figure 4:
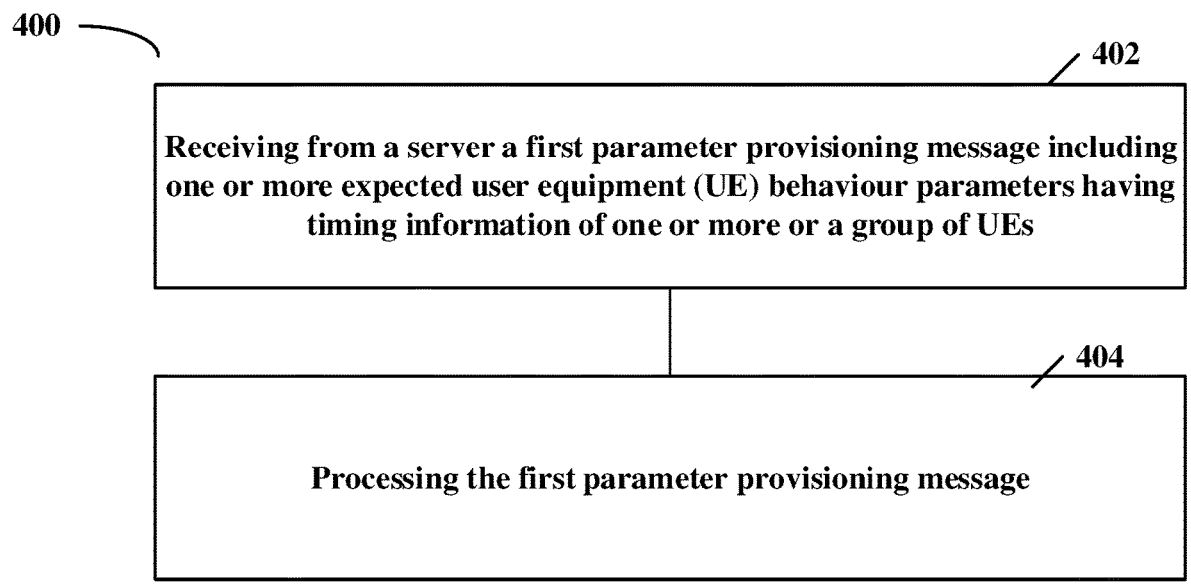
FIG. 4 shows a flowchart of a method according to another embodiment of the present disclosure.

FIG. 4 shows a flowchart of a method 400 according to an embodiment of the present disclosure, which may be performed by an apparatus implemented in or at or as a network exposure entity such as NEF or SCEF or communicatively coupled to the network exposure entity such as NEF or SCEF. As such, the apparatus may provide means or modules or circuits for accomplishing various parts of the method 400 as well as means or modules or circuits for accomplishing other processes in conjunction with other components. For some parts which have been described in the above embodiments, detailed description thereof is omitted here for brevity.

At block 402, the network exposure entity receives from a server a first parameter provisioning message including one or more expected UE behaviour parameters having timing information of one or more or a group of UEs. For example, the server may send the first parameter provisioning message at block 202 of FIG. 2, and then the network exposure entity may receive from the server the first parameter provisioning message.

In an embodiment, the one or more expected UE behaviour parameters comprise expected UE moving trajectory.

In an embodiment, the expected UE moving trajectory comprises one or more locations and the timing information, and the timing information comprises a timestamp or a time of day indicating when a UE arrives at a location and/or duration indicating time that the UE stays in the location.

In an embodiment, the location is identified by at least one of a geographic area; a civic address; a network area information; and a coordinate of the UE.

In an embodiment, the civic address comprises street address and/or zip code, the network area information comprises tracking area identity and/or cell identifier, and the coordinate of the UE comprises longitude and latitude.

In an embodiment, the one or more expected UE behaviour parameters further comprise velocity and/or acceleration information and/or periodicity information.

In an embodiment, the one or more expected UE behaviour parameters have respective associated validity time.

In an embodiment, the first parameter provisioning message is an HTTP POST message for creating new subscription resources of provisioning communication pattern parameter set(s).

In an embodiment, the first parameter provisioning message is an HTTP PUT message for modifying a communication pattern parameter provisioning subscription resource.

In an embodiment, the first parameter provisioning message is an HTTP PUT message for updating communication pattern at individual communication pattern set(s) level associated with a communication pattern parameter set identifier.

In an embodiment, the one or more expected UE behaviour parameters are used for setting of mobility management and/or session management parameters of the one or more or the group of UEs.

At block 402, the network exposure entity processes the first parameter provisioning message. The network exposure entity may perform any suitable processing operations for example depending on the specific network.

In an embodiment, the network exposure entity may determine whether the server is authorised to provision the one or more expected UE behaviour parameters. When the server is not authorised to provision the one or more expected UE behaviour parameters, the network exposure entity may indicate the reason to failure in a message to the server or ignore the first parameter provisioning message.

In an embodiment, when the server is authorised to provision the one or more expected UE behaviour parameters, the network exposure entity may send a second parameter provisioning message including the one or more expected UE behaviour parameters having timing information to a user data management node or a data repository node. The user data management node may implement any suitable user data management function such as generation of 3GPP Authentication and Key Agreement (AKA) Authentication Credentials, User Identification Handling, Support of de-concealment of privacy-protected subscription identifier (SUCI), Access authorization based on subscription data (e.g. roaming restrictions), UE's Serving NF Registration Management, Support to service/session continuity, SMS (Short Messaging Service) delivery support, Lawful Intercept Functionality, Subscription management, SMS management, etc. The data repository node may implement any suitable data repository function such as storage and retrieval of subscription data by the user data management node, storage and retrieval of policy data by the policy control function (PCF), storage and retrieval of structured data for exposure, etc. In an embodiment, the user data management node comprises a unified data management (UDM) node. In an embodiment, the data repository node comprises a unified data repository (UDR) node.

In an embodiment, when the network exposure entity sends the second parameter provisioning message including the one or more expected UE behaviour parameters having timing information to the user data management node, the user data management node may determine whether the server is authorised to provision the one or more expected UE behaviour parameters and request the data repository node to store the one or more expected UE behaviour parameters as a part of subscription data when the server is authorised to provision the one or more expected UE behaviour parameters.

In an embodiment, the network exposure entity may send the second parameter provisioning message including the one or more expected UE behaviour parameters having timing information to the data repository node for example in non-roaming case or if no authorisation or validation is by required the user data management node. In this case, the data repository node may store the one or more expected UE behaviour parameters as a part of subscription data.

In an embodiment, the second parameter provisioning message comprises an Nudm_ParameterProvision_Update request message or Nudr_DM_Update request message. For example, when the network exposure entity sends the second parameter provisioning message including the one or more expected UE behaviour parameters having timing information to the UDM node, the second parameter provisioning message may be the Nudm_ParameterProvision_Update request message. When the network exposure entity sends the second parameter provisioning message including the one or more expected UE behaviour parameters having timing information to the UDR node, the second parameter provisioning message may be the Nudr_DM_Update request message.

In an embodiment, the Nudm_ParameterProvision_Update request message and Nudr_DM_Update request message are a HTTP PATCH request message. For example, the Nudm_ParameterProvision_Update request message may be the corresponding HTTP PATCH request message as described in Table 6.5.3.1-1 of 3GPP TS 29.503 V15.3.0, the disclosure of which is incorporated by reference herein in its entirety. The Nudr_DM_Update request message may be the corresponding HTTP PATCH request message as described in Table 5.2.1-1 3GPP TS 29.505 V15.3.0, the disclosure of which is incorporated by reference herein in its entirety.

In an embodiment, when the one or more expected UE behaviour parameters having timing information have been successfully provisioned, the user data management node may notify a subscribed network function entity of updated subscriber data. For example, the user data management node such as UDM may notify the subscribed Network Function (e.g., AMF) of the updated subscriber data via Nudm_SDM_Notification Notify message as described in clause 4.15.6.2 of 3GPP TS23.502 V15.4.1.

Figure 5:
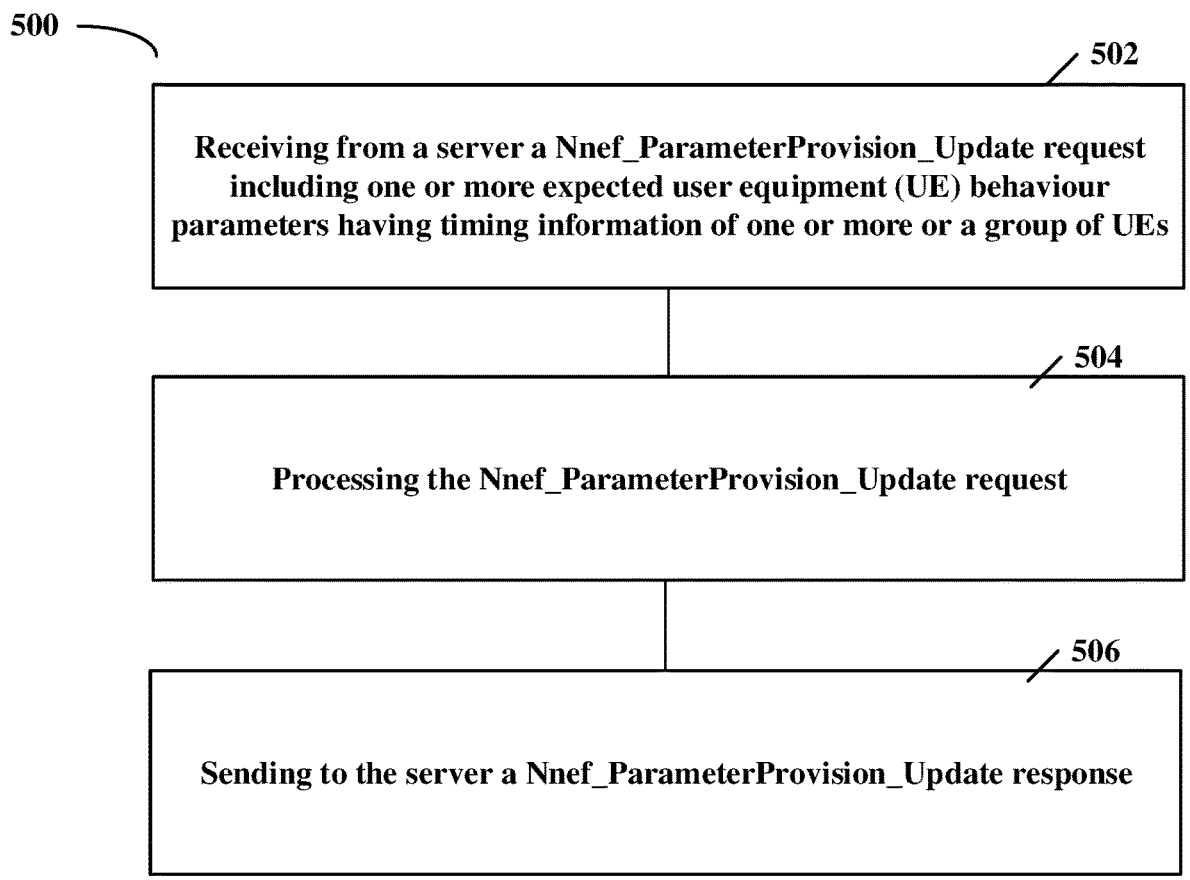
FIG. 5 shows a flowchart of a method according to another embodiment of the present disclosure.

FIG. 5 shows a flowchart of a method 500 according to an embodiment of the present disclosure, which may be performed by an apparatus implemented in or at or as a network exposure entity such as NEF or SCEF or communicatively coupled to the network exposure entity such as NEF or SCEF. As such, the apparatus may provide means or modules or circuits for accomplishing various parts of the method 500 as well as means or modules or circuits for accomplishing other processes in conjunction with other components. In this embodiment, the first parameter provisioning message is a Nnef_ParameterProvision_Update request as described in clause 4.15.6.2 of 3GPP TS23.502 V15.4.1, which includes the one or more expected UE behaviour parameters having timing information of one or more or a group of UEs. For some parts which have been described in the above embodiments, detailed description thereof is omitted here for brevity.

At block 502, the network exposure entity receives from a server a Nnef_ParameterProvision_Update request including one or more expected UE behaviour parameters having timing information of one or more or a group of UEs.

At block 504, the network exposure entity processes the Nnef_ParameterProvision_Update request as described with reference to FIG. 4.

At block 506, the network exposure entity sends to the server a Nnef_ParameterProvision_Update response as described in clause 4.15.6.2 of 3GPP TS23.502 V15.4.1.

Figure 6:
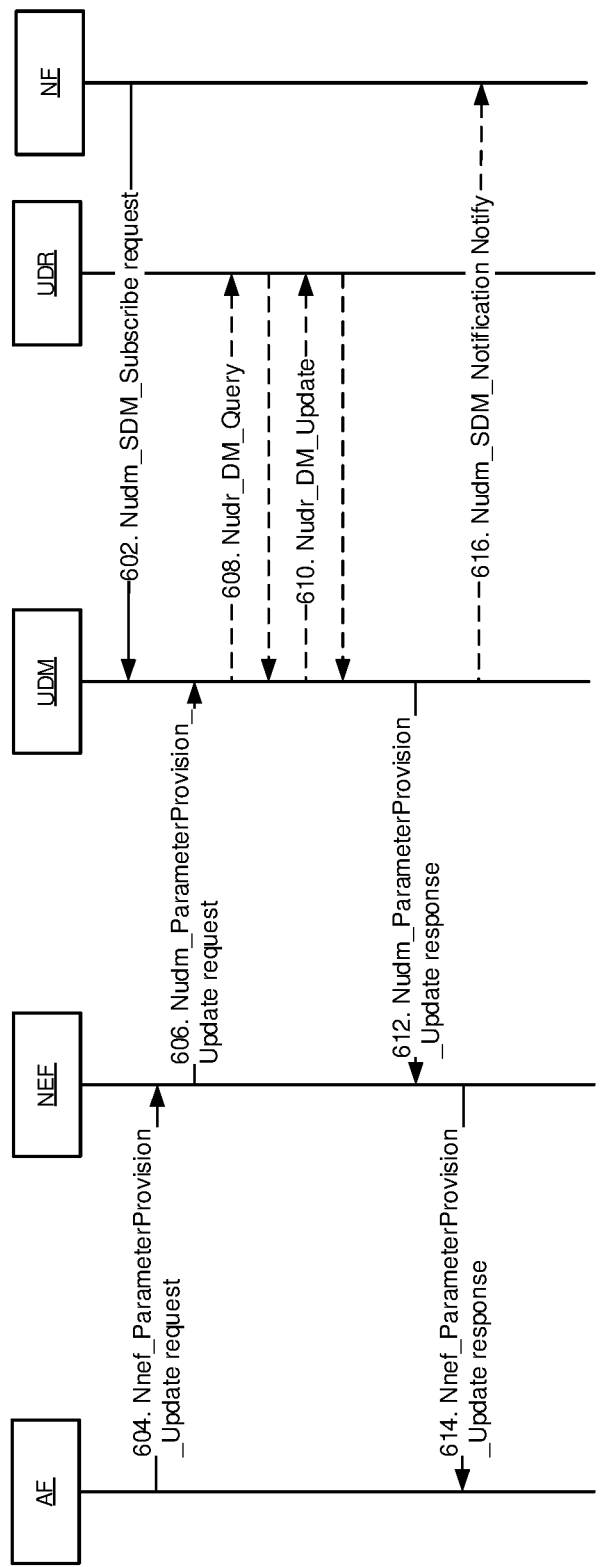
FIG. 6 shows a flowchart of a method according to another embodiment of the present disclosure.

FIG. 6 shows a flowchart of a method according to an embodiment of the present disclosure. In this embodiment, the method may be implemented in 5G network such as NR.

At step 602, NF subscribes to UDM notifications of information updates.

At step 604, AF provides one or more expected UE behaviour parameters having timing information of one or more or a group of UEs to be updated in Nnef_ParameterProvision_Update Request to the NEF. Nnef_ParameterProvision_Update Request may comprise Generic Public Subscription Identifier (GPSI) identifying the UE and Transaction Reference Identifier identifying the transaction request between NEF and AF.

At step 606, if the AF is authorised by the NEF to provision the parameters, the NEF requests to update and store the provisioned parameters as part of the subscriber data via Nudm_ParameterProvision_Update Request message, the message includes the provisioned data and NEF reference ID. If the requester is not authorised to provision data, then the NEF continues in step 614 indicating the reason to failure in Nnef_ParameterProvision_Update Response message. For non-roaming case and no authorisation or validation by the UDM required, the NEF can directly forward the external parameter to the UDR via Nudr_DM_Update Request message. And in this case, the UDR responds to NEF via Nudr_DM_Update Response message.

At step 608, UDM may read from UDR, by means of Nudr_DM_Query, corresponding subscriber information in order to validate required data updates and authorize these changes for this subscriber for the corresponding AF.

At step 610, if the AF is authorised by the UDM to provision the parameters for this subscriber, the UDM resolves the GPSI to SUPI (Subscription Permanent Identifier), and requests to update and store the provisioned parameters as part of the subscriber data via Nudr_DM_Update Request message, the message includes the provisioned data.

UDR stores the provisioned data as part of the subscription data and responds with Nudr_DM_Update Response message.

If the requester is not authorised to provision data, then the UDM continues in step 612 indicating the reason to failure in Nudm_ParameterProvision_Update Response message and step 616 is not executed.

At step 612, UDM responds the request with Nudm_ParameterProvision_Update Response. If the procedure failed, the cause value indicates the reason.

At step 614, NEF responds the request with Nnef_ParameterProvision_Update Response. If the procedure failed, the cause value indicates the reason.

At step 616, after successful step 610, UDM notifies the subscribed NF (e.g., AMF) of the updated subscriber data via Nudm_SDM_Notification Notify message.

The above messages may be similar to the corresponding messages as defined in clause 4.15.6.2 of 3GPP TS23.502 V15.4.1 except that the expected UE behaviour parameter such as UE moving trajectory is enhanced with other useful information such as timing information e.g. duration and timestamp or a time of day.

In an embodiment, a new attribute "expectedUmtTime" may be added in Table 5.10.2.2.2-1 of 3GPP TS 29.122 V16.0.0 as following Table 1. The date types in Table 1 are same as the corresponding date types as defined in 3GPP TS 29.122 V16.0.0. Note that the expectedUmtTime may not be constrained to "day of week", it could be extended with "day of month/year".

TABLE 1

| Attribute name | Data type | Cardinality | Description | Applicability (NOTE 1) |
| --- | --- | --- | --- | --- |
| setId | string | 1 | SCS/AS-chosen correlator provided by the SCS/AS in the request to create a resource fo CP parameter set(s). | |
| self | Link | 0 . . . 1 | Link to the resource "Individual CP set Provisioning". This parameter shall be supplied by the SCEF in HTTP responses. | |

TABLE 1-continued

| Attribute name | Data type | Cardinality | Description | Applicability (NOTE 1) |
|---|---|---|---|---|
| validityTime | DateTime | 0 . . . 1 | Identifies when the CP parameter set expires and shall be deleted. If absent, it indicates that there is no expiration time for this CP parameter set. | |
| periodicCommunicationIndicator | CommunicationIndicator | 0 . . . 1 | Identifies whether UE communicates periodically or on demand. | |
| communicationDurationTime | DurationSec | 0 . . . 1 | Identifies duration time of periodic communication | |
| periodicTime | DurationSec | 0 . . . 1 | Identifies interval time of periodic communication | |
| scheduledCommunicationTime | ScheduledCommunicationTime | 0 . . . 1 | Identifies time zone and day of the week when the UE is available for communication. | |
| stationaryIndication | StationaryIndication | 0 . . . 1 | Identifies whether the UE is stationary or mobile. | |
| expectedUmts | array(UmtLocationArea5G) | 0 . . . N | Identifies the UE's expected geographical movement. The attribute is only applicable in 5G. (NOTE 2) | ExpectedUMT_5G |
| expectedUmtTime | ScheduledCommunicationTime | 0 . . . 1 | Identifies day of the week and the start and stop time in UMT (UE Moving Trajectory). The start and stop time in the scheduledUmtTime may be omitted if the umtTime for the first and last instances of expectedUmts is provided. | ExpectedUMT_5G |

(NOTE 1):
Properties marked with a feature as defined in subclause 5.10.4 are applicable as described in subclause 5.2.7. If no features are indicated, the related property applies for all the features.
(NOTE 2):
The first instance of the attribute represents the start of the location, and the last one represents the stop of the location.

In an embodiment, a new data type, UmtLocationArea5G, may be added in 3GPP TS 29.122 as showed in Table 2. This data type represents the user location area describing the UE moving trajectory which is sent from the AF. The date types in Table 2 are same as the corresponding date types as defined in 3GPP TS 29.122 V16.0.0.

TABLE 2

| Attribute name | Data type | Cardinality | Description | Applicability (NOTE) |
|---|---|---|---|---|
| geographicAreas | array(GeographicArea) | 0 . . . N | Identifies a list of geographic area of the user where the UE is located. | |
| civicAddresses | array(CivicAddress) | 0 . . . N | Identifies a list of civic addresses of the user where the UE is located. | |
| nwAreaInfo | NetworkAreaInfo | 0 . . . 1 | This IE (information element) represents the network area information of the user where the UE is located. | |
| umtTime | TimeOfDay | 0 . . . 1 | This IE identifies the time of the day when the UE arrives the location. | |
| umtDuration | DurationSec | 0 . . . 1 | This IE identifies the time the UE stays in the location. | |

(NOTE):
Properties marked with a feature as defined in subclause 5.10.4 of 3GPP TS 29.122 are applicable as described in subclause 5.2.7 of 3GPP TS 29.122. If no features are indicated, the related property applies for all the features.

In an embodiment, the following content may be added in CpProvisioning API of 3GPP TS 29.122 V16.0.0:

```
expectedUmtTime:
      $ref: '#/components/schemas/ScheduledCommunicationTime'
UmtLocationArea5G:
   type: object
   properties:
      geographicAreas:
```

```
        type: array
        items:
            $ref: 'TS29572_Nlmf_Location.yaml#/components/schemas/GeographicArea'
        minItems: 0
        description: Identifies a list of geographic area of the user where the UE is located.
    civicAddresses:
        type: array
        items:
            $ref: 'TS29572_Nlmf_Location.yaml#/components/schemas/CivicAddress'
        minItems: 0
        description: Identifies a list of civic addresses of the user where the UE is located.
    nwAreaInfo:
        $ref: 'TS29554_Npcf_BDTPolicyControl.yaml#/components/schemas/NetworkAreaInfo'
    umtTime:
        $ref: 'TS29122_CommonData.yaml#/components/schemas/TimeOfDay'
    umtDuration:
        $ref: 'TS29122_CommonData.yaml#/components/schemas/DurationSec'
```

The various blocks shown in FIGS. 2-6 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

The solution according to embodiments of the disclosure can avoid misuse of the expected UE behaviour parameters provided by the AF and improve the mobility management and/or session management of the one or more or the group of UEs.

Figure 7A:
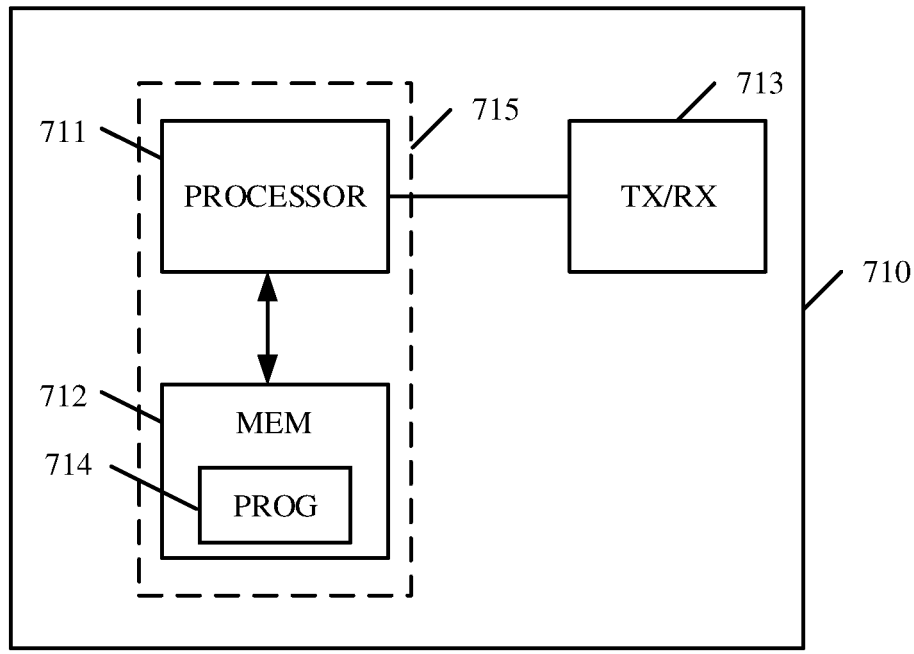
FIG. 7a illustrates simplified block diagrams of an apparatus according to an embodiment of the present disclosure.
Figure 7B:
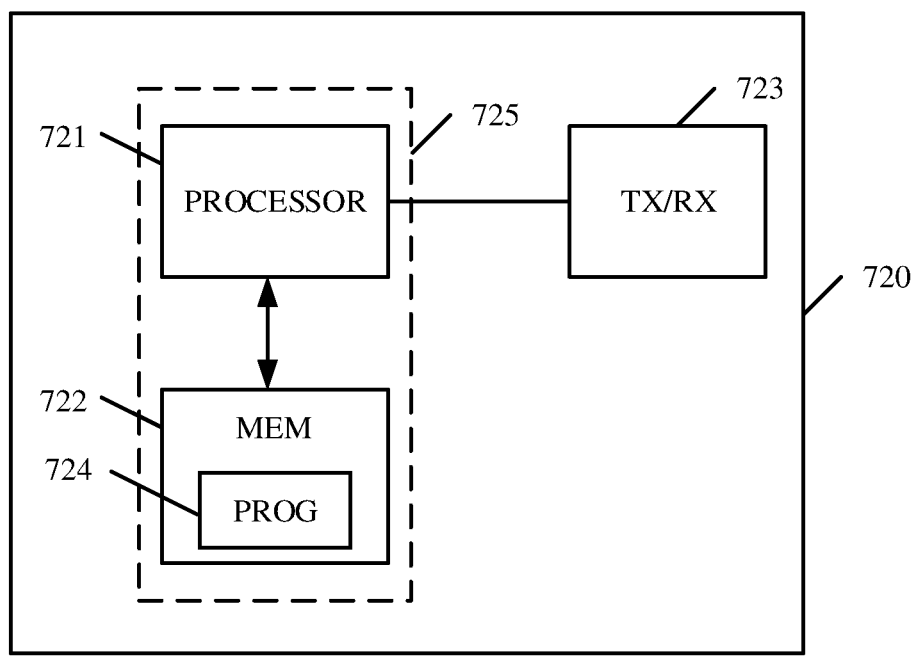
FIG. 7b illustrates simplified block diagrams of an apparatus according to another embodiment of the present disclosure.

FIG. 7a illustrates a simplified block diagram of an apparatus 710 that may be embodied in/as a server according to an embodiment of the present disclosure. FIG. 7b illustrates an apparatus 720 that may be embodied in/as a network exposure entity according to an embodiment of the present disclosure.

The apparatus 710 may comprise at least one processor 711, such as a data processor (DP) and at least one memory (MEM) 712 coupled to the processor 711. The apparatus 710 may further comprise a transmitter TX and receiver RX 713 coupled to the processor 711. The MEM 712 stores a program (PROG) 714. The PROG 714 may include instructions that, when executed on the associated processor 711, enable the apparatus 710 to operate in accordance with the embodiments of the present disclosure, for example to perform the method related to the server as described above. A combination of the at least one processor 711 and the at least one MEM 712 may form processing means 715 adapted to implement various embodiments of the present disclosure.

The apparatus 720 comprises at least one processor 721, such as a DP, and at least one MEM 722 coupled to the processor 721. The apparatus 720 may further comprise a transmitter TX and receiver RX 723 coupled to the processor 721. The MEM 722 stores a PROG 724. The PROG 724 may include instructions that, when executed on the associated processor 721, enable the apparatus 720 to operate in accordance with the embodiments of the present disclosure, for example to perform the method related to the network exposure entity as described above. A combination of the at least one processor 721 and the at least one MEM 722 may form processing means 725 adapted to implement various embodiments of the present disclosure.

Various embodiments of the present disclosure may be implemented by computer program executable by one or more of the processors 711 and 721, software, firmware, hardware or in a combination thereof.

The MEMs 712 and 722 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processors 711 and 721 may be of any type suitable to the local technical environment, and may include one or more of general purpose computers, special purpose computers, microprocessors, digital signal processors DSPs and processors based on multicore processor architecture, as non-limiting examples.

According to an aspect of the disclosure it is provided a computer program product being tangibly stored on a computer readable storage medium and including instructions which, when executed on at least one processor, cause the at least one processor to carry out any of the methods related to the server as described above.

According to an aspect of the disclosure it is provided a computer program product being tangibly stored on a computer readable storage medium and including instructions which, when executed on at least one processor, cause the at least one processor to carry out any of the methods related to the network exposure entity as described above.

According to an aspect of the disclosure it is provided a computer-readable storage medium storing instructions which when executed by at least one processor, cause the at least one processor to carry out any of the methods related to the server as described above.

According to an aspect of the disclosure it is provided a computer-readable storage medium storing instructions which when executed by at least one processor, cause the at least one processor to carry out any of the methods related to the network exposure entity as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform one or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a server, comprising:
obtaining one or more expected user equipment (UE) behaviour parameters having timing information of one or more or a group of UEs; and
sending to a network exposure entity a first parameter provisioning message including the one or more expected UE behaviour parameters having timing information that corresponds to expected UE moving trajectories of one or more or a group of UEs as well as a timestamp indicating when a UE arrives at a location and a duration that the UE stays in the location, wherein the one or more expected UE behaviour parameters further comprise periodicity information indicating expected UE behaviour periodicity.

2. The method according to claim 1, wherein obtaining one or more expected UE behaviour parameters having timing information of one or more or a group of UEs comprises:
receiving the one or more expected UE behaviour parameters having timing information of one or more or a group of UEs from the one or more or the group of UEs; and/or
determining the one or more expected UE behaviour parameters having timing information of one or more or the group of UEs based on activity of the one or more or the group of UEs.

3. The method according to claim 1, wherein the one or more expected UE behaviour parameters comprise expected UE moving trajectory.

4. The method according to claim 1, wherein the expected UE moving trajectory comprises one or more locations.

5. The method according to claim 1, wherein the location is identified by at least one of:
a geographic area;
a civic address;
a network area information; and
a coordinate of the UE;
wherein the civic address comprises street address and/or zip code, the network area information comprises tracking area identity and/or cell identifier, and the coordinate of the UE comprises longitude and latitude.

6. The method according to claim 1, wherein the one or more expected UE behaviour parameters further comprise velocity and/or acceleration information and/or
wherein the one or more expected UE behaviour parameters have respective associated validity time.

7. The method according to claim 1, wherein:
the first parameter provisioning message is a Hypertext Transfer Protocol (HTTP) POST message for creating new subscription resources of provisioning communication pattern parameter set(s); or
the first parameter provisioning message is an HTTP PUT message for modifying a communication pattern parameter provisioning subscription resource; or
the first parameter provisioning message is an HTTP PUT message for updating communication pattern at individual communication pattern set(s) level associated with a communication pattern parameter set identifier.

8. The method according to claim 1, wherein the server comprises a service capability server/an application server (SCS/AS) or an application function (AF) entity and the network exposure entity comprises a service capability exposure function (SCEF) entity or a network exposure function (NEF) entity.

9. The method according to claim 1, wherein the first parameter provisioning message is a Nnef_ParameterProvision_Update request and the method further comprises:
receiving from the network exposure entity a Nnef_ParameterProvision_Update response.

10. A method at a network exposure entity, comprising:
receiving from a server a first parameter provisioning message including one or more expected user equipment (UE) behaviour parameters having timing information that corresponds to expected UE moving trajectories of one or more or a group of UEs as well as a timestamp indicating when a UE arrives at a location and a duration that the UE stays in the location, wherein the one or more expected UE behaviour parameters further comprise periodicity information indicating expected UE behaviour periodicity; and
processing the first parameter provisioning message.

11. The method according to claim 10, wherein the expected UE moving trajectory comprises one or more locations.

12. The method according to claim 10, wherein the location is identified by at least one of:
a geographic area;
a civic address;
a network area information; and
a coordinate of the UE;
wherein the civic address comprises street address and/or zip code, the network area information comprises tracking area identity and/or cell identifier, and the coordinate of the UE comprises longitude and latitude.

13. The method according to claim 10, wherein the one or more expected UE behaviour parameters further comprise velocity and/or acceleration information.

14. The method according to claim 10, wherein the one or more expected UE behaviour parameters have respective associated validity time.

15. The method according to claim 10, wherein:
the first parameter provisioning message is a Hypertext Transfer Protocol (HTTP) POST message for creating new subscription resources of provisioning communication pattern parameter set(s); or
the first parameter provisioning message is an HTTP PUT message for modifying a communication pattern parameter provisioning subscription resource; or
the first parameter provisioning message is an HTTP PUT message for updating communication pattern at individual communication pattern set(s) level associated with a communication pattern parameter set identifier.

16. The method according to claim 10, wherein the server comprises a service capability server/an application server (SCS/AS) or an application function (AF) entity and the network exposure entity comprises a service capability exposure function (SCEF) entity or a network exposure function (NEF) entity.

17. The method according to claim 10, wherein the one or more expected UE behaviour parameters are used for setting of mobility management and/or session management parameters of the one or more or the group of UEs.

18. The method according to claim 10, wherein the first parameter provisioning message is a Nnef_ParameterProvision_Update request and the method further comprises:
sending to the server a Nnef_ParameterProvision_Update response.

19. The method according to claim 10, wherein processing the first parameter provisioning message comprises:
determining whether the server is authorised to provision the one or more expected UE behaviour parameters; and
when the server is authorised to provision the one or more expected UE behaviour parameters, sending a second parameter provisioning message including the one or more expected UE behaviour parameters having timing information to a user data management node or a data repository node.

20. The method according to claim 19,
wherein the user data management node is configured to determine whether the server is authorised to provision the one or more expected UE behaviour parameters and request the data repository node to store the one or more expected UE behaviour parameters as a part of subscription data when the server is authorised to provision the one or more expected UE behaviour parameters,
wherein the data repository node is configured to store the one or more expected UE behaviour parameters as a part of subscription data.

21. The method according to claim 19, wherein the user data management node comprises a unified data management (UDM) node and/or the data repository node comprises a unified data repository (UDR) node.

22. The method according to claim 19, wherein the second parameter provisioning message comprises an Nudm_ParameterProvision_Update request message or Nudr_DM_Update request message;
wherein the Nudm_ParameterProvision_Update request message and Nudr_DM_Update request message are a Hypertext Transfer Protocol (HTTP) PATCH request message.

23. The method according to claim 19, wherein the user data management node is configured to notify a subscribed network function entity of updated subscriber data.

24. An apparatus implemented at a server, comprising:
a processor; and
a memory coupled to the processor, said memory containing instructions executable by said processor, whereby said apparatus is operative to:
obtain one or more expected user equipment (UE) behaviour parameters having timing information that corresponds to expected UE moving trajectories of one or more or a group of UEs; and
send to a network exposure entity a first parameter provisioning message including the one or more expected UE behaviour parameters having timing information of one or more or a group of UEs as well as a timestamp indicating when a UE arrives at a location and a duration that the UE stays in the location, wherein the one or more expected UE behaviour parameters further comprise periodicity information indicating expected UE behaviour periodicity.

25. An apparatus implemented at a network exposure entity, comprising:
a processor; and
a memory coupled to the processor, said memory containing instructions executable by said processor, whereby said apparatus is operative to:
receive from a server a first parameter provisioning message including one or more expected user equipment (UE) behaviour parameters having timing information that corresponds to expected UE moving trajectories of one or more or a group of UEs as well as a timestamp indicating when a UE arrives at a location and a duration that the UE stays in the location, wherein the one or more expected UE behaviour parameters further comprise periodicity information indicating expected UE behaviour periodicity; and process the first parameter provisioning message.

* * * * *